H. ALLIOT.
EDUCATIONAL APPARATUS.
APPLICATION FILED JUNE 25, 1912.

1,054,890.

Patented Mar. 4, 1913.

Witnesses:—

Inventor:—
Hector Alliot

UNITED STATES PATENT OFFICE.

HECTOR ALLIOT, OF LOS ANGELES, CALIFORNIA.

EDUCATIONAL APPARATUS.

1,054,890.  Specification of Letters Patent.  Patented Mar. 4, 1913.

Application filed June 25, 1912. Serial No. 705,871.

*To all whom it may concern:*

Be it known that I, HECTOR ALLIOT, a citizen of the United States, residing at Los Angeles, in the county of Los Angeles and State of California, have invented a new and useful Educational Apparatus, of which the following is a specification.

This invention is designed to obviate the difficulties of finding cities, towns, stars or other named places on geographical and astronomical maps and charts; and consists of the combination with a map or chart of a graduated quadrant or other arc in fixed relation to the map or chart, a graduated rule in movable relation to the arc and the map or chart, and an index list comprising names of places indicated on the map or chart and two characters for each name, one indicating a point on the rule and the other indicating the point on the arc at which the rule will cross the arc when said point on the rule is adjacent the named place on the map.

The invention may be carried out in various ways and the graduated arc may be located at different parts of the map or chart and may be of any extent to accommodate the conditions of the map.

The invention comprises a map provided with variously located names of places, a graduated and numbered arc and an index to such places, said index containing the names of the places accompanied with numbers corresponding to the numbers of the arc which are in line between the named places respectively and the center from which the arc is inscribed.

It also includes the combination with a map having named places thereon, of a numbered rule in pivotal relation to the map or chart and corresponding numbers on the rule and index, the numbers on the index being adjacent the names thereon that designate places on the map which the corresponding numbers on the rule will pass near to, respectively, as the rule is swung on its pivot.

The accompanying drawings illustrate the invention.

Figure 1:
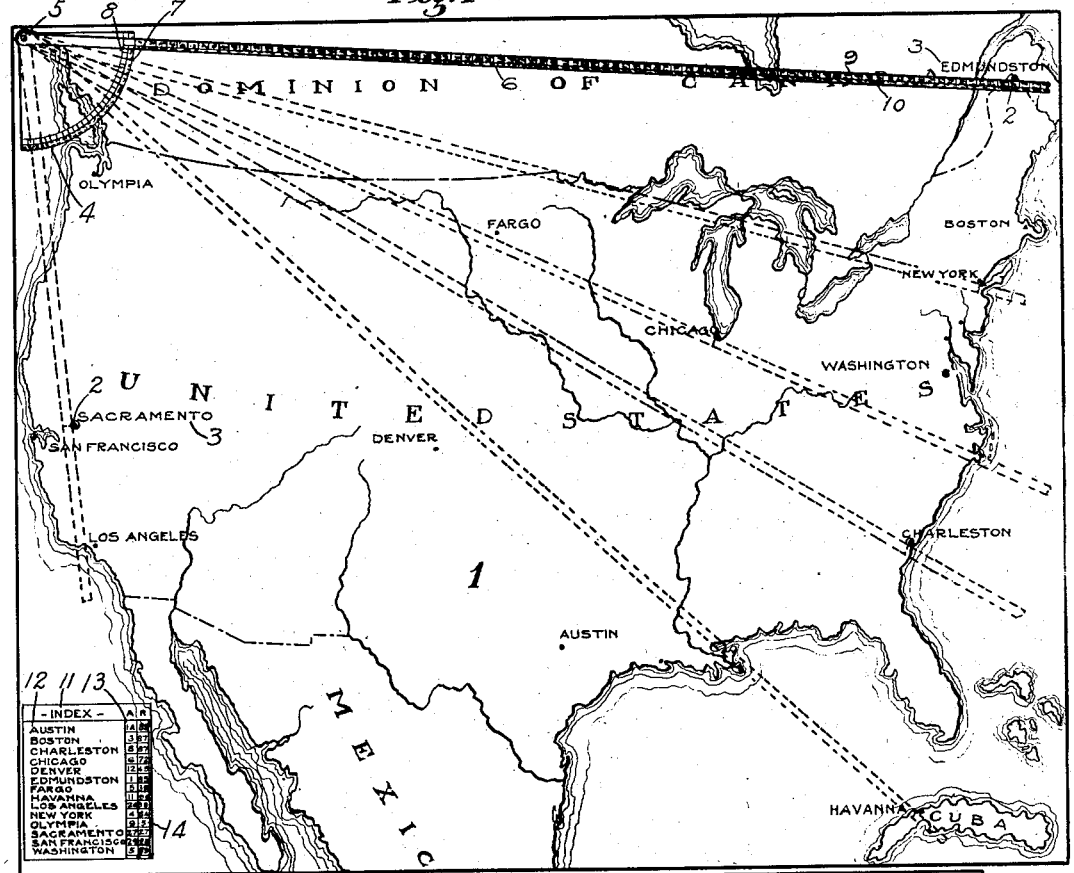
Figure 2:
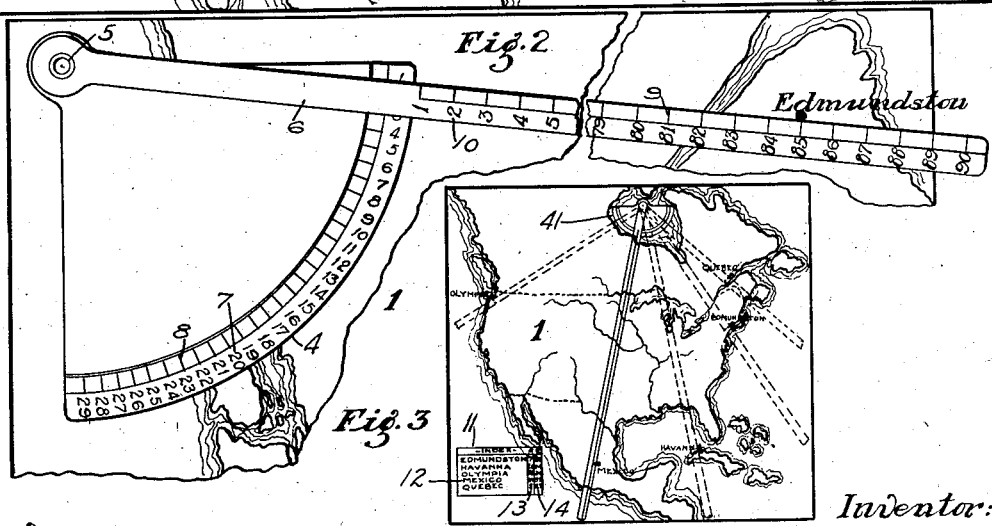
Figure 3:
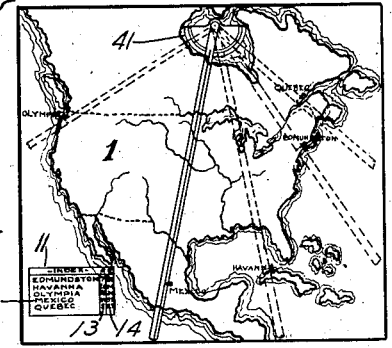

Figure 1 is a view of a combined index map or chart and finder embodying the invention in a practical form, a quadrant being applied in one corner of the map or chart. Fig. 2 is an enlarged fragmental detail of parts of the apparatus shown in Fig. 1. Fig. 3 is a view of the apparatus applied with a graduated arc forming a semi-circle applied to the middle of one margin of a map or chart.

The map or chart 1 is provided with the usual markings 2, 3, indicating the places and the names thereof upon the map.

4 designates the graduated arc extending part way around the center 5 on which the graduated rule 6 is pivoted; said arc being marked with characters 7 in numerical order to indicate the graduations 8; and the rule 6 being marked with the graduations 9 and their characters 10 in numerical order indicating measurements along the rule. The index 11 is made up of the names 12 of places on the map or chart preferably arranged in alphabetical order each name being that of a named place on the map and each being accompanied by two reference characters 13, 14 corresponding respectively to characters on the graduated arc and rule; the graduation on the arc thus referred to by the index character 13 at any name in the index being the graduation at which the rule will cross the arc when the graduation on the rule indicated by the other index character 14 is adjacent the place on the map indicated by the index name; so that when the rule is adjusted to the indicated arc graduation, the indicated rule graduation will be near the indicated place on the map.

The graduated arc may be applied to the map in any way. In some instances it is printed thereon and in other instances it is printed on some other substance, such as paper, cardboard, metal or some translucent material as celluloid applied to and held on the map by any suitable means so as to be in appropriate fixed relation thereto, and the rule may be made of the same or any other suitable material. The extent of the arc will depend upon the location it occupies relative to the places on the map. If located in the corner of the map a quadrant will be sufficient. If located at the middle of one margin of the map a semi-circle may be required as shown at 41 in Fig. 3.

In practical use a person using the combined index map or chart and finder will first ascertain from the index the quadrant and rule graduations pertaining to the place it is desired to find, as for instance, in Figs. 1 and 2, to find the town of Edmundston the index shows the arc number to be 1 and the rule number to be 85. Having ascertained these arc and rule numbers the user will note on the rule the number 85 pertaining to the place and will swing the rule to the number 1 on the arc, thus bringing the numeral 85 on the rule to the place Edmundston on the map where said place is at once noted.

It is evident that the manner of applying the invention to astronomical charts, not shown, will be practically the same as herein illustrated with relation to terrestrial maps or charts, and the manner of use will be practically the same in any instance.

By frequent use the user may become so accustomed to the angle indicated on the arc that he will find it unnecessary to consult the quadrant, but will simply note the index and the marking on the rule and by swinging the rule to the approximate angle will be able to readily locate the desired point. Consequently, it would not be a departure from the broad spirit of this invention to omit from the map and index the actual markings for the arc, provided the index contain reference characters for the rule, with or without characters that may be understood as indicating a certain angle with relation to the center on which the rule is pivoted. In case all reference to the angle or arc numbers be omitted from the map or chart and index, then the user will note on the index and rule the rule number of the place and will swing the rule on its pivot until such place is reached by the rule number.

The facility of finding the place is increased by the use of the arc numbers in the index and map. It is also understood that by printing or otherwise fixing the graduated arc on the map and providing an index referring to the graduations substantially as set forth and to graduations on any rule, say for instance, a yard stick, it is not necessary to pivot a special rule on the map; the measurement being easily made under direction from the arc by a standard rule. The rule 6 may be a tape fastened to the publications and in the case of atlases or other books may be applied in the manner of an ordinary ribbon bookmark and thus be made to serve for a plurality of maps or charts contained in one binding. The numbers on the index, the arc and the rule or either of them may be in the form of any character of ordinals alphabetical or arithmetical as desired.

I claim:

1. An educational apparatus comprising an indexed map or chart having a graduated arc in fixed relation thereto; a graduated rule in movable relation to the arc; the index comprising names of places indicated on the map or chart and two characters for each name, one indicating a point on the rule and the other indicating the point on the arc at which the rule will cross the arc when said point on the rule is adjacent the named place on the map or chart.

2. A map or chart provided with named places and also with a graduated and numbered arc and an index; said index comprising names of said places and numbers accompanying the names respectively to indicate the arc graduations respectively that are between the arc center and the named places respectively.

3. A map or chart having an arc graduated and numbered printed thereupon for the specific purpose of locating places, cities or stars.

4. A map or chart having an arc graduated and numbered arranged thereupon for the specific purpose of locating places, cities, stars or other objects; and a rule graduated and numbered and pivoted at the center of the arc to coöperate therewith for the said purpose.

5. A map provided with a graduated and numbered arc and with indications of the locations of places on the map, a rule in pivotal relation to the map from the center of said arc, said rule being graduated and the graduations numbered, and an index containing the names of places on the map or chart and also containing numbers to indicate a point at which to place the rule on the arc for the purpose of finding said place and also the number on the rule at which said place will be found when the rule is placed as indicated relative to the arc.

In testimony whereof, I have hereunto set my hand at Los Angeles, California, this 20th day of June, 1912.

HECTOR ALLIOT.

In presence of—
JAMES R. TOWNSEND,
L. BELLE RICE.